United States Patent
Winkler et al.

(10) Patent No.: US 9,360,349 B2
(45) Date of Patent: Jun. 7, 2016

(54) CAPSULE FOR SCIENTIFIC INSTRUMENT

(75) Inventors: Yves Winkler, Schmitten (CH); Yvan Ferri, Lausanne (CH); Nicolas Rebeaud, Le Mont-sur-Lausanne (CH)

(73) Assignee: The Swatch Group Research and Development Ltd, Marin (CH)

( * ) Notice: Subject to any disclaimer, the term of this patent is extended or adjusted under 35 U.S.C. 154(b) by 181 days.

(21) Appl. No.: 13/991,791

(22) PCT Filed: Dec. 14, 2011

(86) PCT No.: PCT/EP2011/072770
§ 371 (c)(1),
(2), (4) Date: Aug. 30, 2013

(87) PCT Pub. No.: WO2012/080344
PCT Pub. Date: Jun. 21, 2012

(65) Prior Publication Data
US 2013/0329533 A1     Dec. 12, 2013

(30) Foreign Application Priority Data

Dec. 17, 2010   (EP) .................................... 10195828

(51) Int. Cl.
| | |
|---|---|
| G04B 5/20 | (2006.01) |
| G01D 11/26 | (2006.01) |
| G01L 7/10 | (2006.01) |
| G04B 5/22 | (2006.01) |
| G04B 47/06 | (2006.01) |
| G04G 21/02 | (2010.01) |

(52) U.S. Cl.
CPC ................ *G01D 11/26* (2013.01); *G01L 7/102* (2013.01); *G04B 5/22* (2013.01); *G04B 47/066* (2013.01); *G04G 21/02* (2013.01)

(58) Field of Classification Search
CPC ............. G04B 5/203; G04B 3/12; G04B 1/26
See application file for complete search history.

(56) References Cited

U.S. PATENT DOCUMENTS

| | | | |
|---|---|---|---|
| 6,427,444 B1 | 8/2002 | Miyazawa | |
| 2010/0024562 A1* | 2/2010 | Kurth et al. | ..................... 73/702 |
| 2011/0056301 A1 | 3/2011 | Winkler et al. | |
| 2012/0024432 A1 | 2/2012 | Bazin et al. | |

FOREIGN PATENT DOCUMENTS

| | | |
|---|---|---|
| EP | 1 101 937 | 5/2001 |
| EP | 2 113 759 | 11/2009 |
| EP | 2113759 A1 * | 11/2009 |
| EP | 2 180 385 | 4/2010 |
| FR | 2 209 093 | 6/1974 |
| FR | 2209093 A1 * | 6/1974 |

OTHER PUBLICATIONS

International Search Report issued Mar. 16, 2012 in PCT/EP11/072770 filed Dec. 14, 2011.

* cited by examiner

*Primary Examiner* — Amy Cohen Johnson
*Assistant Examiner* — Jason Collins
(74) *Attorney, Agent, or Firm* — Oblon, McClelland, Maier & Neustadt, L.L.P.

(57) ABSTRACT

A capsule including two shells secured to each other so to be joined by a common closed surface and together defining, on both sides of the surface, a closed space delimited by the shells. At least one of the two shells is a flexible membrane configured to deform under effect of a physical magnitude. At least the membrane is made of at least partially amorphous metal alloy to optimize dimensions of the capsule.

26 Claims, 4 Drawing Sheets

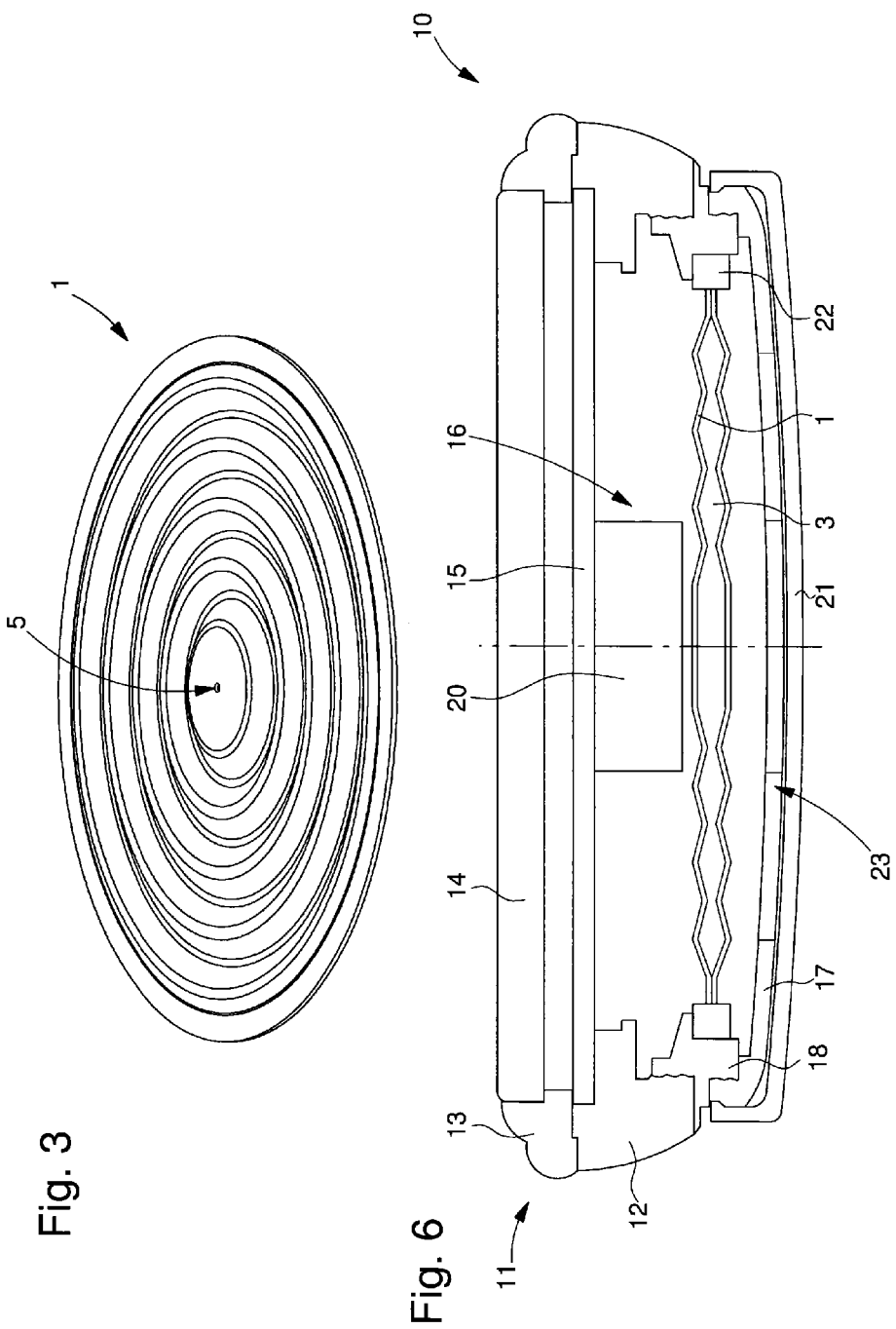

CAPSULE FOR SCIENTIFIC INSTRUMENT

CROSS-REFERENCE TO RELATED APPLICATIONS

This is a National Phase Application in the United States of International Patent Application PCT/EP2011/072770 filed Dec. 14, 2011, which claims priority on European Patent Application No. 10195828.8 of Dec. 17, 2010. The entire disclosures of the above patent applications are hereby incorporated by reference.

The present invention concerns a capsule comprising two shells secured to each other so that they are joined by a common closed surface and together define, on either side of said surface, a closed space delimited by said shells. At least one of the two shells is a flexible membrane which is deformable under the effect of a physical magnitude.

BACKGROUND OF THE INVENTION

There is known in the prior art a scientific instrument or portable object such as a diver's watch or an altimeter, which comprises a case carrying a pressure sensor. The sensor includes a membrane and a transmission device. The membrane is capable of being mechanically deformed under the effect of external pressure acting on the transmission device. This device thus transfers said movement of deformation (representative of pressure) for example to amplify the movement in order to display the pressure value detected by the sensor.

It is also known to use these capsules as an energy source for timepieces. These capsules contain a liquid such as ethyl chloride. The liquid reacts to temperature change and vaporises when the temperature rises and thus increases the pressure inside the capsule. The capsule cooperates with a winding spring retained by a shell connected to a chain by a pulley. The latter winds the barrel spring in a series of back and forth motions via a click system, ratchet and intermediate wheel.

When the temperature rises, the capsule winds the winding spring so that the chain relaxes and releases the pulley. When the temperature drops, the capsule contracts, allowing the winding spring to pull on the chain and wind the barrel.

Generally, these capsules are made by assembling two shells or membranes via the periphery or edges thereof so that there is a space between the two membranes. The membranes forming the capsule are made of crystalline material, such as, for example, an alloy comprising copper and beryllium (Cu—Be).

Each material is characterized by its Young's modulus E or modulus of elasticity (generally expressed in GPa), characterizing its resistance to deformation. Further, each material is also characterized by its limit of elasticity $\sigma_e$ (generally expressed in GPa) which represents the stress beyond which the material deforms plastically. Thus, it is possible to compare materials of a given thickness, by establishing the ratio of the limit of elasticity to the Young's modulus $\sigma_e/E$ for each material, as said ratio is representative of the elastic deformation of each material. Thus, the higher the ratio, the higher the elastic deformation of the material will be. However, the crystalline materials used in the prior art, for example, the alloy Cu-Be, which has a Young's modulus E equal to 130 GPa and a typical limit of elasticity $\sigma_e$ value of 1 GPa, give a low $\sigma_e/E$ ratio of around 0.007. The elastic deformation of these crystalline alloy capsules is consequently limited. In an application to an altimeter or energy source for winding a barrel, this respectively means a limited measuring range and a low winding force.

Further, since this elastic limit is low, when the capsule deforms, it comes close to its plastic deformation limit under low levels of stress with the risk of not being able to return to its initial shape. To prevent this type of deformation, limits are placed on the deformation of the capsule, i.e. the amplitude of movement of the capsule is deliberately limited. It is clear then that, for the altimeter application, the transfer movement must be amplified. This then causes a noise which is harmful to the altimeter and, incidentally, to the display of the measured value.

Moreover, the space between the membranes is placed under vacuum or filled with liquid. The capsule must then be sealed against leakage. To achieve this, a solder is generally used to secure the two membranes and seal said capsule against leakage.

This method of assembling and sealing the capsule limits the type of materials that can be used. Indeed, those skilled in the art may envisage using materials with better mechanical properties such as metallic glass or amorphous metals. However, the use of such materials with the generally used manufacturing method described above will be rejected. This choice is made because those skilled in the art will have the preconceived idea that the usual technique cannot be used to make a capsule without altering the characteristics of the capsule. Indeed, they will have the preconceived idea that using soldering to assemble and seal the capsule will alter the properties of the amorphous material of which it is formed, since the soldering operation requires an increase in temperature. This temperature increase may then cause the amorphous metal to crystallise if the temperature attains a temperature between the crystallisation temperature and the vitreous transition temperature of said amorphous metal.

This partial crystallisation of the capsule causes an alteration of its features and thus results in different behaviour. Those skilled in the art are not therefore attracted by the use of amorphous metals to manufacture a capsule.

SUMMARY OF THE INVENTION

The invention concerns a capsule which overcomes the aforementioned drawbacks of the prior art by proposing a more reliable capsule which has a safety margin with respect to the maximum stress applied but also enjoys greater possible deformation amplitude. Alternatively, the invention proposes a capsule providing equivalent deformation amplitude for smaller dimensions.

The invention therefore concerns a capsule comprising two shells secured to each other so that they are joined by a common closed surface and defining together, on either side of said surface, a closed space delimited by said shells, the two shells being a flexible membrane that is deformable under the effect of a physical magnitude, characterized in that at least one of said membranes is made of an at least partially amorphous metal alloy so as to optimise the dimensions of said capsule.

In a first advantageous embodiment, said metal alloy of the membrane has a limit of elasticity to Young's modulus ratio of more than 0.01.

In a second advantageous embodiment, said metal alloy of the membrane has a Young's modulus of more than 50 GPa.

In a third advantageous embodiment, the two shells are flexible deformable membranes.

In a fourth advantageous embodiment, the two flexible deformable membranes are made in said at least partially amorphous metal alloy.

In another advantageous embodiment, the capsule is in a single piece and the two shells form one and the same part.

In another advantageous embodiment, said metal alloy is totally amorphous.

In another advantageous embodiment, said metal alloy includes at least one metal element which is precious and selected from the group comprising gold, platinum, palladium, rhenium, ruthenium, rhodium, silver, iridium or osmium.

In another advantageous embodiment, said metal alloy does not include any allergens.

In another advantageous embodiment, each membrane is substantially discoid.

In another advantageous embodiment, each membrane has a non-rectilinear section so as to increase its deformation surface.

In another advantageous embodiment, the section of the membrane includes at least one sinusoidal portion.

A first advantage of the capsule of the present invention is that it has more advantageous elastic characteristics. In fact, in the case of an amorphous material, the σe/E ratio is increased by raising the limit of elasticity σe. The stress beyond which the material does not return to its initial shape is therefore increased. This improvement in the σe/E ratio thus provides greater deformation. This optimises the dimensions of the capsule according to whether it is desired to increase the range of measurement or deformation of the capsule or to reduce the size of said capsule for an equivalent range of measurement or deformation.

Another advantage of these amorphous materials is that they offer new shaping possibilities for developing parts of complicated shapes with greater precision. Indeed, amorphous metals have the particular characteristic of softening while remaining amorphous within a given temperature range [Tg–Tx] peculiar to each alloy (where Tx is the crystallisation temperature and Tg is the vitreous transition temperature). It is therefore possible to shape these metals with a relatively low level stress and at a low temperature. This means that fine geometries can be very accurately reproduced since the viscosity of the alloy is greatly decreased and the latter thus adopts all the details of the mould.

This accuracy can also be obtained by injecting liquid metal into a mould. This metal is then very quickly cooled to avoid crystallisation and thus becomes amorphous. This method is advantageous since, because amorphous metal does not have a crystalline structure when it solidifies, the amorphous metal is only very slightly subject to solidification shrinkage. Thus, in the case of a crystalline material, the solidification shrinkage may attain 5 to 6%, which means that the size of the capsule decreases by 5 to 6% when it solidifies. However, in the case of amorphous metal, this shrinkage is around 0.5%.

Further, the invention also concerns a scientific instrument which is characterized in that it includes a pressure sensor using the capsule according to the invention.

In another advantageous embodiment, the scientific instrument further includes a means of converting said value representing pressure into a depth value, allowing said watch to perform a depth meter function.

In another advantageous embodiment, the scientific instrument further includes a means of converting said value representing pressure into an altitude value allowing said watch to perform an altimeter function.

In another advantageous embodiment of the scientific instrument the space between the two shells is placed under vacuum of between $10^{-3}$ and $10^{-7}$ mbar.

In another advantageous embodiment, said instrument is a portable timepiece.

Further, the invention also concerns a timepiece which is characterized in that it includes the capsule of the invention for winding a barrel supplying energy to said timepiece.

An advantageous embodiment of this timepiece forms the subject of dependent claims.

BRIEF DESCRIPTION OF THE DRAWINGS

The objects, advantages and features of the capsule according to the present invention will appear more clearly in the following detailed description of at least one embodiment of the invention, given solely by way of non-limiting example and illustrated by the annexed drawings, in which:

FIG. 3 shows a schematic perspective view of a variant of the capsule according to the present invention.

FIG. 6 is a longitudinal cross-section of a watch comprising a pressure sensor using the capsule according to the present invention.

DETAILED DESCRIPTION OF THE INVENTION

Figure 1:
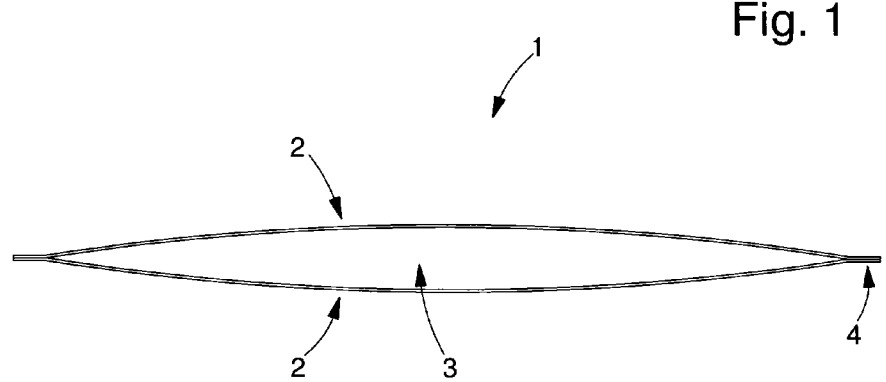
FIG. 1 shows a schematic cross-section of the capsule according to the present invention.
Figure 2:
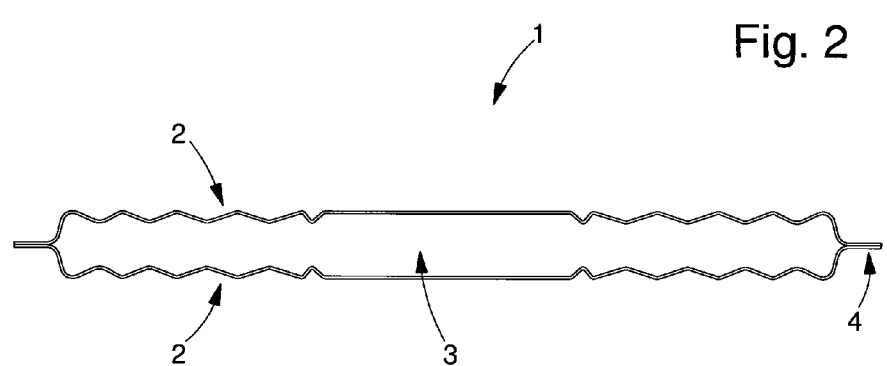
FIG. 2 shows a schematic cross-section of a variant of the capsule according to the present invention.

FIGS. 1 to 2 show a cross-section of a capsule 1 according to the present invention. This capsule 1 is formed of two shells 2. These two shells 2 are joined by a common closed surface 4 and together define, on either side of said common surface, a closed space 3 delimited by said shells 2. Advantageously, the two shells 2 are secured to each other so that the space 3 between the two shells 2 is totally insulated from the external space.

According to the application concerned, at least one of the two shells 2 is arranged to be a deformable membrane. This membrane 2 is arranged so that, under the effect of a physical magnitude such as temperature or pressure, it can deform, with the deformation being linked to this physical magnitude. Preferably, both shells 2 are arranged in the form of deformable membranes 2.

Advantageously according to the invention, at least one of membranes 2 of capsule 1 comprises an amorphous material, namely partially amorphous or totally amorphous. This partially or totally amorphous material is obtained by melting and mixing elements forming said material, then by rapid cooling so as to at least partially or totally prevent said material from crystallising. In particular, metallic glasses are used, i.e. amorphous metal alloys. Preferably, capsule 1 includes two membranes 2 made of amorphous metal or alloy. It is this variant which will be used in the following description. A capsule 1, wherein at least one of membranes 2 of capsule 1 includes an amorphous or partially amorphous material, will thus be called a "capsule made of amorphous materials".

Figure 4:
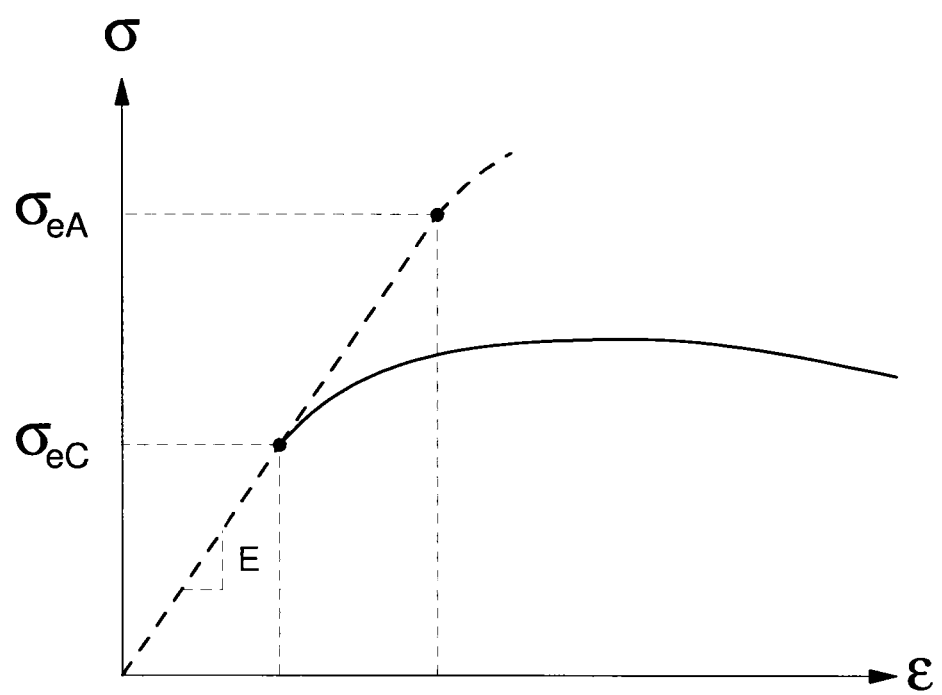
FIG. 4 shows the deformation curves for a crystalline material and for an amorphous material.

Indeed, the advantage of these amorphous metal alloys arises from the fact that, during manufacture, the atoms forming the amorphous material do not arrange themselves in a particular structure as is the case of crystalline materials. Thus, even if the Young's modulus E of a crystalline material and an amorphous material are close, their limits of elasticity $\sigma_e$ are different. Amorphous material differs therefore in that it has a higher limit of elasticity $\sigma_{ea}$ than that of crystalline metal in a ratio substantially equal to two as shown in FIG. 4. This Figure shows the curve of the stress $\sigma$ according to deformation $\epsilon$ for an amorphous material (in dotted lines) and for a crystalline material. This means that amorphous materials can undergo greater deformation before reaching the limit of elasticity $\sigma_e$.

First of all, this capsule 1 with at least one shell 2 made of amorphous material improves the reliability of the mechanism in which it is found compared to a capsule 1 made of crystalline material. Indeed, the limit of elasticity $\sigma_{ea}$ is higher, which means that the plastic domain is further away and thus there is a reduced risk of capsule 1 plastically deforming under the effect of the stress applied.

Secondly, it is to be noted that a capsule 1 with at least one shell 2 made of amorphous material optimises the size of the shell in order to cover the same travel for the same centrally applied stress, i.e. at a distance from the joining surface of shells 2. It is assumed that the dimensions of capsule 1 alter its deformation. Hence, it is noted that if the diameter is increased then the theoretical travel of capsule 1 increases. Further, if the thickness is increased, the theoretical travel of capsule 1 decreases. Advantageously, if the limit of elasticity increases, then the stress that can be applied to capsule 1 without any plastic deformation, increases. It thus becomes possible to keep the same amplitude of movement by reducing the diameter and thickness of the capsule. Capsule 1 consequently becomes more compact.

As regards the material itself, it may first of all be considered that the higher the $\sigma_e/E$ ratio, the more efficient capsule 1 will be. Advantageously, materials with a $\sigma_e/E$ ratio of more than 0.01 are the most suitable materials for making a capsule 1. It should also be specified that aside from the $\sigma_e/E$ ratio, the value of E may also be selected to be higher than a certain limit, so that the capsule can be contained within an acceptable volume. Preferably, this limit is set at 50 GPa.

Next, other features may be taken into account. Thus, it may be considered that the properties of corrosion resistance and non-magnetism are especially advantageous for a diver's watch. "Non-magnetic" means a soft magnetic material, preferably with relative permeability of around 50 to 200, and especially a high saturation field value of more than 500 Nm. The following may be cited as amorphous materials that may be used: Zr41Ti14Cu12Ni10Be23 (which has a Young's modulus E value of 105 GPa and limit of elasticity of $\sigma_e=1.9$ GPa) has a ratio $\sigma_e/E=0.018$ and Pt57.5Cu14.7Ni5.3P22.3 (which has Young's modulus E value of 98 GPA and limit of elasticity value of $\sigma_e=1.4$ GPa) has a ratio $\sigma_e/E=0.014$.

Of course, there are other features which may be advantageous such as the allergenic aspect of the alloy. Indeed, it may be noted that whether the materials are crystalline or amorphous they often use alloys comprising allergens. For example, these types of alloys include cobalt or nickel. Thus, variants of the capsule according to the present invention may be made with alloys that do not contain these allergens. It may also provided that allergens are present but do not cause an allergic reaction. To achieve this, it may be provided that a capsule 1 which contains these allergens does not release them when capsule 1 is attacked by corrosion.

According to another variant of the invention, capsule 1 may be made of noble material. Indeed, in the crystalline state, alloys made of noble materials such as gold or platinum are too soft to make a flexible robust capsule 1. However, as soon as they take the form of metallic glass, i.e. an amorphous state, these precious metal alloys are then provided with features such that it becomes possible to use them for manufacturing a capsule 1 while offering a precious, attractive appearance. Preferably, platinum 850 (Pt 850) and gold 750 (Au 750) are the precious metal alloys which are used for making said capsule. Of course, other precious metals may be used, such as palladium, rhenium, ruthenium, rhodium, silver, iridium and osmium. The use of these amorphous precious metal alloys for a capsule goes against preconceived ideas as to the low mechanical characteristics of precious metals.

One great advantage of amorphous metals or metal alloys lies in their great shapeability. Indeed, amorphous metals have the peculiar characteristic of softening while remaining amorphous within a given temperature range [Tx–Tg] peculiar to each alloy (for example for a $Zr_{41.24}Ti_{13.75}CU_{12.5}Ni_{10}Be_{22.5}$ alloy Tg=350° C. and Tx=460° C.) It is therefore possible to shape these metals under relatively low stress (1 MPa) and at low temperatures, i.e. lower than 600° C.

The shaping method consists of hot working an amorphous preform. The preform is obtained by melting the metallic elements forming the amorphous alloy in a furnace. The melting is carried out in a controlled atmosphere in order to obtain the lowest possible oxygen contamination of the alloy.

For example, to make one of membranes 2 of capsule 1, the molten elements are cast in the form of semi products, such as for example a disc whose dimensions are close to membrane 2, and then rapidly cooled to preserve the amorphous state. Once the preform has been obtained, hot working is used to obtain a finished part. This hot working is achieved by pressing within a temperature range of between Tg and Tx for a determined period of time in order to preserve a totally or partially amorphous structure. For this hot working method, the pressing is followed by cooling. The pressing and cooling must be sufficiently rapid to prevent any crystallisation of the material forming membrane 2. Indeed, for a given material at a given temperature between its vitreous transition temperature Tg and its crystallisation temperature Tx, there is a maximum duration beyond which said material crystallises. This duration decreases when the temperature gets close to its crystallisation temperature Tx and the duration increases when the temperature gets close to its vitreous transition temperature Tg. Thus, the amorphous material will crystallise if the time spent at a temperature comprised between Tg and Tx exceeds a certain specific value for each temperature/alloy pair. Typically for a Zr41.2Ti13.8Cu12.5Ni10Be22.5 alloy and a temperature of 440° C., the pressing time should not exceed a value of around 120 seconds. Thus, the at least partially amorphous initial state of the preform will be maintained.

This is carried out for the purpose of keeping the characteristic elastic properties of amorphous metals. The various final shaping steps of capsule 1 are thus:
a) Heating the dies having the negative shape of membrane 2 to a selected temperature.
b) Inserting an amorphous metal disc between the hot dies.
c) Applying a closing force onto the dies to replicate the geometry of said dies on the amorphous metal disc.
d) Waiting for a selected maximum time.
e) Opening the dies.
f) Rapidly cooling the membrane to below Tg.
g) Finally, removing membrane 2 from the dies.

This shaping method can very accurately reproduce fine geometries since the viscosity of the alloy is greatly decreased, and the alloy therefore adopts all the details of the mould. For example, for a platinum-based material, shaping occurs at around 300° C. for a viscosity of up to $10^3$ Pa·s with a stress of 1 MPa, instead of a viscosity of $10^{12}$ Pa·s at temperature Tg. The advantage of this method is that there is no solidification shrinkage which provides a part that perfectly reproduces the contours and details of the dies.

Of course, other types of shaping are possible such as shaping using casting or injection. This method consists in moulding the alloy obtained by melting metallic elements in a furnace, in the form of any part, such as a bar, which may be either in a crystalline or amorphous state. Then, this alloy part of any shape is melted again in order to be poured or pressure injected into a mould having the shape of the final part. Once the mould has been filled, it is rapidly cooled to a temperature below $T_g$ to prevent the alloy from crystallising and thus to obtain an amorphous or semi-amorphous metal membrane. This method is advantageous since, because amorphous metal does not have a crystalline structure when it solidifies, the amorphous metal is only very slightly subject to solidification shrinkage. Thus, in the case of a crystalline material, this solidification shrinkage may attain 5 to 6% which means that the size of capsule 1 decreases by 5 to 6% when it solidifies. However, in the case of amorphous metal, this shrinkage is around 0.5%. Further, pouring or injection are long-standing methods and are consequently simple and inexpensive.

Once the two membranes 2 have been formed, they are assembled to each other on their common closed surface or edge 4 in order to form capsule 1. The joining of the two membranes 2 may be achieved by various methods, such as welding, or soldering or bonding.

Another method consists in using the properties of amorphous metals. To achieve this, the two membranes 2 are placed one on top of the other. The periphery of the membranes is thus heated to a temperature of between Tg and Tx. Then, the periphery is pressed between clamps. These clamps include studs in a comb arrangement so that, when pressed by the clamps, the studs of the clamps cause mechanical interactions to form between the two membranes 2 and secure them to each other.

Preferably, this securing operation is carried out so that capsule 1 is sealed and space 3 between the two membranes 2 is totally insulated from the exterior.

Following solidification, a step of placing under vacuum or filling is carried out. The vacuum present in capsule 1 is around $10^{-3}$-$10^{-7}$ mbar bearing in mind that, the higher the vacuum, the better the performance will be. This operation of placing under vacuum or filling is generally achieved via an orifice 5 made in one of membranes 2 as seen in FIG. 3. This orifice 5 is then blocked by applying a metal stopper. Orifice 5 is preferably located at the centre of one of membranes 2 since this is a place which undergoes very little stress, unlike an orifice placed on the junction between the two membranes 2, where they are joined to each other.

Figure 5:
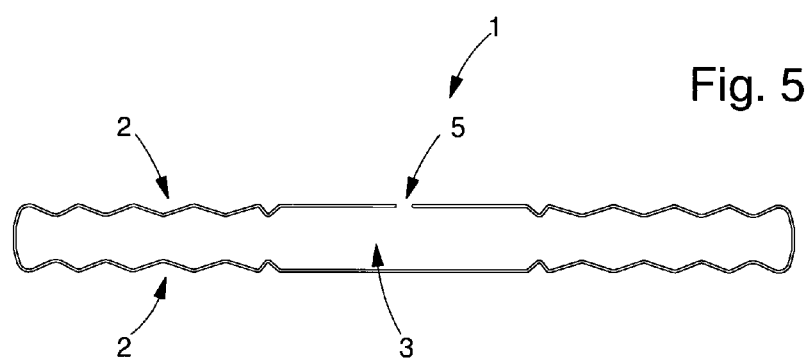
FIG. 5 shows a schematic cross-section of a single-piece variant of the capsule according to the present invention.

In another variant of the method used, the shapeability of amorphous metal advantageously means that capsule 1 can be formed in a single piece as shown in FIG. 5. Indeed, with hot shaping or casting methods, it becomes possible to make dies or a mould forming the exact pattern for capsule 1. These methods are used for filling the dies or the mould with amorphous metal as explained above. A supplementary step is dissolving the dies or the mould.

Indeed, in order to make capsule 1, the dies or the mould must include an insert creating the space between the membranes which will be placed under vacuum or filled with liquid. When capsule 1 is made, the amorphous metal is deposited around said insert, confining it within amorphous metal. Capsule 1 is consequently removed from the mould by dissolving the mould or the dies in a chemical bath. The product used is selected in accordance with the material forming the mould or the dies. The capsule 1 thereby formed has only one orifice 5 which must be blocked in order to seal the capsule.

The next step consists in filling capsule 1 with liquid or forming a vacuum in said capsule 1 depending upon the application and then blocking orifice 5 in order to ensure that capsule 1 is sealed. This filling or placing under vacuum is performed via orifice 5 which is created during hot working or casting.

This variant has multiple advantages. First of all, this variant provides a capsule 1 that is simpler to produce since there is no operation of joining the two membranes 2 and therefore one step fewer. The joining operation is complex since it must provide a durable join and proper sealing without crystallising the amorphous metal. By making a single-piece capsule 1, there are no membranes 2 to be joined and consequently, the sealing problems associated with the join do not arise. A single-piece capsule 1 thus prevents the onset of a complex problem to resolve. It is simpler to seal capsule 1 since only orifice 5 for filling or placing the capsule under vacuum has to be blocked rather than the entire periphery of capsule 1 which has to be sealed.

Moreover, this variant makes better use of the surface of capsule 1. Indeed, when capsule 1 is made by joining two membranes 2, the membranes 2 must be devised such that the common closed surface or joining area 4 does not adversely affect the performance of capsule 1. To achieve this, membranes 2 are devised so that their periphery is an area specifically for the joint and not an active area during operation of capsule 1. This specific joint area is therefore not useful for the operation of the capsule. With the method of the present variant, there is no joint and thus it is no longer necessary to have a useless area provided for this joint. Capsule 1 is therefore more compact and simpler to devise.

An alternative to this variant consists in using the blow moulding method. To achieve this, a preform 4 of amorphous material is made. This preform is made by casting the molten elements forming the desired alloy in the form of a semi product, such as for example, a ball, a tube or tube with a base, and then rapidly cooled to preserve the amorphous state.

The preform is then placed in a mould whose pattern is identical to that of the capsule it is desired to make.

The preform is then heated to a temperature comprised between Tg and Tx so that the amorphous metal becomes viscous and easily malleable.

Next, a blow nozzle is inserted into the preform so that the blowing step can start. This blowing step consists in injecting pressurised air or gas into the preform. The preform stretches under the effect of this pressure and because the metal forming the preform is viscous. The stretching of the amorphous metal causes the metal to bond to the walls of the pattern cavity of the mould. The amorphous metal is then rapidly cooled so that it does not crystallise.

The final step consists in removing the cooled capsule from the mould by opening the mould in two parts.

The advantage of this alternative is that the mould is less complex since it may be made of two parts that fit together. Moreover, there is less complexity since, compared to the preceding single-piece part, the insert used to form the closed space between membranes 2 is not present and consequently, a conventional reusable mould may be used.

Moreover, the shaping properties of the amorphous metal mean that membranes 2 or a capsule 1 can be made with the desired geometry. For example, it is possible to alter the properties of membranes 2 or capsule 1 by shaping its section, as well as its thickness or diameter. By way of example, it is possible to obtain a membrane 2 having a sinusoidal section 6 as shown in FIGS. 2, 3 and 5. This type of shape can increase the surface area of the membrane and also its rigidity. Membrane is thus harder to deform. This arrangement of the section advantageously means that the elastic deformation of the material can be linearised according to pressure.

This linearisation is thus an aid in simplifying the means of converting the deformation of membrane 11 into a pressure value.

This capsule 1 may be used in a scientific instrument such as a diver's watch 10, shown in FIG. 6, comprising a case 11 including a middle part 12 on which there is fixed a bezel 13 carrying the crystal 14 of the watch 10. Underneath crystal 14 there is arranged a display device 15 which is also fixed to middle part 12. In this type of application, the internal space of capsule 1 is placed under vacuum.

Watch 10 is closed by a back cover 17 secured in a sealed manner to an intermediate part 18 which is in turn fixed in a sealed manner to middle part 2, thus forming a case. The watch also includes a pressure sensor 16 preferably located inside case 211.

The pressure sensor 16 includes a transmission device 20 and a capsule 1. The capsule is located inside case 11 of watch 10 and fixed to a support 22. This ensures good deformation of the capsule. In this example, support 22 is fixed to intermediate part 18. Support 22 and intermediate part 18 are arranged so that the external faces of said capsule 1 are in contact with the external pressure and can be deformed by external pressure. In order for capsule 1 to be in contact with the external environment, back cover 17 of case 21 is pierced with several orifices or holes 23. These orifices or holes 23 allow membranes 2 of capsule 1 to deform if the external pressure and pressure inside capsule 1 are different.

Further, it may be provided that back cover 17 of case 21 is fitted with a removable cap 21 that can be snap fitted so as to block orifices or holes 23 when a pressure measurement is not required. This protects pressure sensor 16.

Transmission device 10 is used in conjunction with said capsule for The operation of pressure sensor 16. Thus, under the effect of the pressure difference between space 3 and the external environment, the capsule will be deformed to a greater or lesser extent. Indeed, if the external pressure is greater than the pressure inside capsule 1, the capsule will then deform and shrink the volume of space 3 of capsule 1. Conversely, at altitude, the external pressure is lower than the pressure inside capsule 1, and the capsule will deform such that the volume of space 3 of capsule 1 increases.

This deformation of the capsule acts on transmission device 20 which detects the position of the capsule compared to its initial position. The initial position is preferably the position in which the pressure is equal on both sides of the capsule. Once detection has been carried out, transmission device 20 transmits this deformation of the capsule deformation, for example, via a mechanical motion.

The motion representing pressure transmitted by device 20 could be amplified and then used by display device 15. The display device uses a means of converting the motion representing the deformation and thus the pressure, into a depth or altitude value. Next, device 15 will display the depth measured by said pressure sensor 16. Of course, it may be provided that the pressure detection is carried out by any other means, such as a piezoelectric transducer device. Further, other functions which use pressure, such as an altimeter or meteorological function may be envisaged.

The elements of sensor 16 are thus calibrated according to predetermined technical specifications defining the required measuring range of the capsule travel. The required measuring range represents the maximum or minimum pressure value that is required to be detected and displayed, for example a depth of 100 meters. The travel of the capsule, which consists of adding the deformation of each shell 2 relative to its rest position, defines the maximum deformation that said capsule can take. Thus, the features of the capsule are defined from these two values. The capsule is characterized by its dimensions (In one example, the capsule has a diameter of 40 mm and a thickness of 3 mm) and by the the material of which it is formed.

Figure 7:
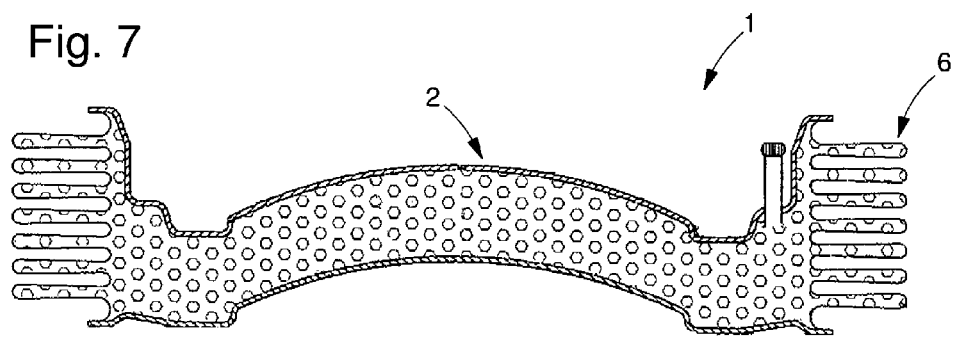
FIGS. 7 and 8 show a longitudinal cross-section of the capsule and of a timepiece using the capsule according to the present invention for winding a barrel.
Figure 8:
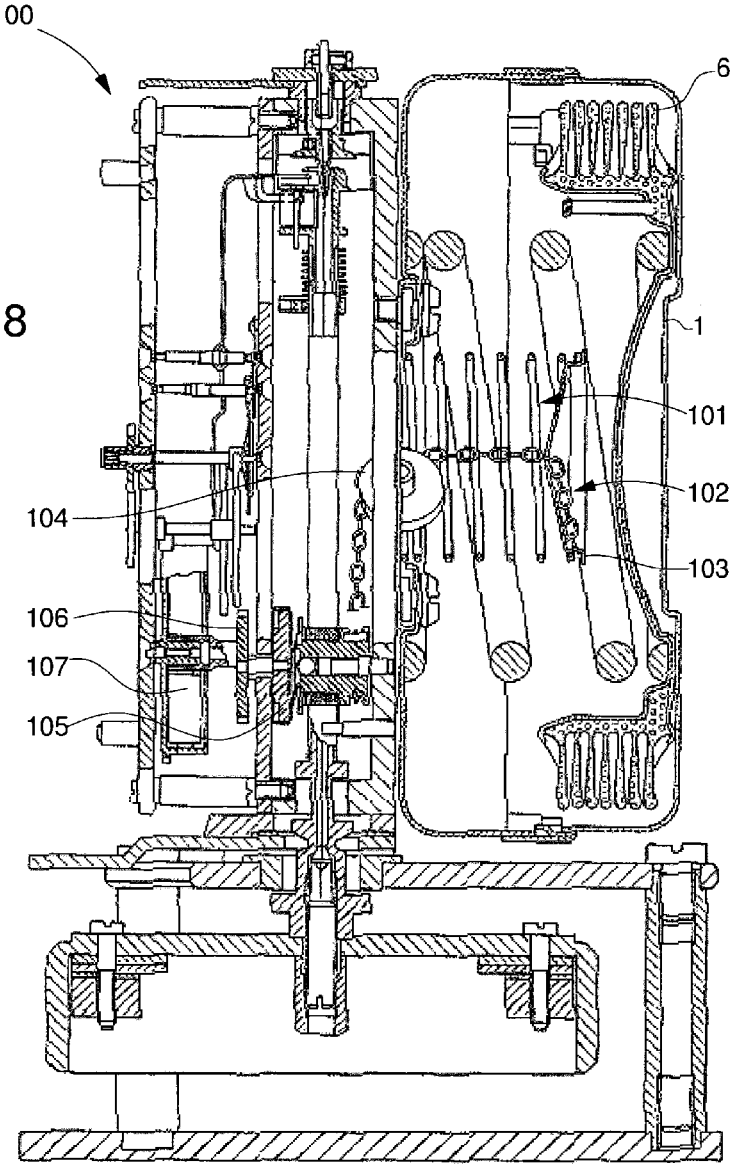

Another application of capsule 1 according to the present invention is the use thereof as an element for winding a barrel 107 in a timepiece 100 as seen in FIGS. 7 and 8. To achieve this, these capsules 1 are filled with liquid such as for example ethyl chloride. The liquid reacts to temperature change and vaporises when the temperature rises and thus increases the pressure inside the capsule. The volume of the capsule increases and thus cooperates with a winding spring 101. The spring is retained by a shell 103 connected to a chain 102 by a pulley 104. When there are temperature or pressure variations, capsule 1 causes chain 102 to move and thus rotates pulley 104. The pulley cooperates with a click system of a ratchet 105 and an intermediate wheel 106 to wind the mainspring 107.

The advantage of the capsule according to the present invention compared to a capsule made of crystalline materials is that a capsule 1 made of amorphous material will have a greater travel. This therefore means that barrel 107 will be wound more since chain 102 will have greater amplitude of movement. The rotation of pulley 104 is consequently greater and thus barrel 107 is wound more quickly and efficiently. If the travel is greater for an amorphous metal capsule 1 than for a crystalline metal capsule 1, an equivalent travel can therefore be obtained with a more compact capsule 1 and thus a more compact timepiece.

Further, capsules for the application to winding a barrel advantageously include bellows 6. The bellows 6, formed of several stages, are arranged on the periphery of capsule 1 and are used for containing the liquid of capsule 1 when said capsule contracts. The contraction at the centre of the capsule thus expels the liquid which will be housed in each stage of bellows 6. The bellows undergo stress from the liquid and deform under this stress. With the use of amorphous metal, it is possible to reduce the size of bellows 6. This is possible since the amorphous metal can withstand higher stress before deforming plastically and thus each stage of bellows 6 can contain more liquid.

It will be clear that various alterations and/or improvements and/or combinations evident to those skilled in the art may be made to the various embodiments of the invention set out above without departing from the scope of the invention defined by the annexed claims. For example, the capsule, or membrane, may have a different shape. It is also clear that the capsule according to the present invention may be used in trigger, devices, delay devices and physical magnitude variation devices, such as trigger systems for various applications (demolition, drilling, mining or similar).

The invention claimed is:

1. A capsule, comprising:
   two shells secured to each other so as to be joined by a common closed surface and together defining, on both sides of the surface, a closed space delimited by the shells,
   the two shells being flexible membranes configured to deform under effect of a physical magnitude,
   wherein only one of the membranes is made of an at least partially amorphous metal alloy in order to optimize dimensions of the capsule, and wherein the two secured shells are supported only at a periphery of the common closed surface.

2. The capsule according to claim 1, wherein the metal alloy has a limit of elasticity to Young's modulus ratio of more than 0.01.

3. The capsule according to claim 1, wherein the metal alloy has a Young's modulus of more than 50 GPa.

4. The capsule according to claim 1, wherein the metal alloy is completely amorphous.

5. The capsule according to claim 1, wherein the metal alloy includes at least one precious metal element selected from the group including gold, platinum, palladium, rhenium, ruthenium, rhodium, silver, iridium, or osmium.

6. The capsule according to claim 1, wherein the metal alloy is free of any allergens.

7. The capsule according to claim 1, wherein each membrane is substantially discoid.

8. The capsule according to claim 1, wherein each membrane has a non-rectilinear section to increase deformation surface thereof.

9. The capsule according to claim 8, wherein the section of the membrane includes at least one sinusoidal part.

10. A scientific instrument, comprising:
a pressure sensor, the sensor including a capsule in cooperation with a transmission device configured to provide, from deformation of the capsule, a value representative of pressure, wherein the capsule conforms to claim 1.

11. The scientific instrument according to claim 10, further comprising a means of converting a value representative of pressure into a depth value allowing a watch to perform a depth meter function.

12. The scientific instrument according to claim 10, further comprising a means of converting a value representative of pressure into an altitude value allowing a watch to perform an altimeter function.

13. The scientific instrument according to claim 10, wherein the space between the two shells is placed under vacuum between $10^{-3}$ mbar and $10^{-7}$ mbar.

14. The scientific instrument according to claim 10, wherein the instrument is a portable timepiece.

15. A timepiece, comprising:
a movement powered by a mainspring, the mainspring being wound by a winding system, wherein the winding system is actuated by the capsule according to claim 1, the capsule being configured to contract or expand as a function of temperature or pressure when there is a variation in at least one physical magnitude.

16. The timepiece according to claim 15, wherein the space between the two shells is filled with a liquid configured to react to variations in temperature.

17. A capsule, comprising:
two shells secured to each other so as to be joined by a common closed surface and together defining, on both sides of said surface, a closed space delimited by the shells,
the two shells being flexible membranes configured to deform under effect of a physical magnitude,
wherein the two flexible deformable membranes are made of an at least partially amorphous metal alloy in order to optimize dimensions of the capsule, and
wherein the two secured shells are supported only at a periphery of the common closed surface.

18. The capsule according to claim 17, wherein the metal alloy has a limit of elasticity to Young's modulus ratio of more than 0.01.

19. The capsule according to claim 17, wherein the metal alloy has a Young's modulus of more than 50 GPa.

20. The capsule according to claim 17, wherein the capsule is a single-piece and wherein the two shells form one and a same single part.

21. The capsule according to claim 17, wherein the metal alloy is completely amorphous.

22. The capsule according to claim 17, wherein the metal alloy includes at least one precious metal element and is selected from the group including gold, platinum, palladium, rhenium, ruthenium, rhodium, silver, iridium, or osmium.

23. The capsule according to claim 17, wherein the metal alloy is free of any allergens.

24. The capsule according to claim 17, wherein each membrane is substantially discoid.

25. The capsule according to claim 17, wherein each membrane has a non-rectilinear section in order to increase deformation surface thereof.

26. The capsule according to claim 25, wherein the section of the membrane includes at least one sinusoidal part.

* * * * *